(12) United States Patent
Akechi

(10) Patent No.: US 8,858,682 B2
(45) Date of Patent: Oct. 14, 2014

(54) METHOD FOR CONTROLLING PRESSURE-DIFFERENCE BUBBLE TRANSFER

(75) Inventor: Masakazu Akechi, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 1159 days.

(21) Appl. No.: 12/159,602

(22) PCT Filed: Dec. 28, 2005

(86) PCT No.: PCT/JP2005/024104
§ 371 (c)(1),
(2), (4) Date: Jun. 27, 2008

(87) PCT Pub. No.: WO2007/077607
PCT Pub. Date: Jul. 12, 2007

(65) Prior Publication Data
US 2009/0233351 A1 Sep. 17, 2009

(51) Int. Cl.
*B01D 53/24* (2006.01)
*B01D 59/20* (2006.01)
*B01D 53/22* (2006.01)
*B01D 71/50* (2006.01)
*B01D 63/08* (2006.01)
*B01J 19/00* (2006.01)
*B01D 19/00* (2006.01)
*B01D 71/32* (2006.01)

(52) U.S. Cl.
CPC ......... *B01J 19/0093* (2013.01); *B01D 2325/38* (2013.01); *B01D 53/228* (2013.01); *B01D 71/50* (2013.01); *B01D 63/087* (2013.01); B01D 2323/04 (2013.01); B01J 2219/0086 (2013.01); *B01D 19/0031* (2013.01); *B01J* 2219/00783 (2013.01); B01D 2323/283 (2013.01); B01J 2219/00833 (2013.01); *B01D* 71/32 (2013.01); B01D 2325/021 (2013.01); B01J 2219/00831 (2013.01); B01J 2219/00963 (2013.01); B01J 2219/00907 (2013.01)
USPC ............. 95/46; 95/172; 95/45; 96/181; 96/4; 96/6; 96/155

(58) Field of Classification Search
CPC ............... B01D 19/00; B01D 19/0031; B01D 19/0073; B01D 63/087; B01L 3/502753; B01L 2300/14
USPC .......................... 95/172, 45, 46; 96/181, 4, 6
See application file for complete search history.

(56) References Cited

U.S. PATENT DOCUMENTS

| 3,526,481 A | 9/1970 | Rubricius |
| 5,416,022 A | 5/1995 | Amiot |

(Continued)

FOREIGN PATENT DOCUMENTS

| FR | 2 478 482 A1 | 9/1981 |
| JP | 53-094942 U | 8/1978 |

(Continued)

OTHER PUBLICATIONS

English translation of JP 2005-329333 Kotaro et al.*

(Continued)

*Primary Examiner* — Nathan Bowers
(74) *Attorney, Agent, or Firm* — Cheng Law Group, PLLC

(57) ABSTRACT

In order to control bubble removal or mixing in a flow channel, bubble transfer between flow channels (1, 2) is controlled by disposing first flow channel (1) for flow of a first fluid of liquid or gas and second flow channel (2) for flow of a second fluid of liquid with, interposed therebetween, gas exchange unit (5) through which while no liquid can pass, a gas component can be transferred, and by providing a pressure difference between the flow channels (1, 2) with the gas exchange unit (5). By rendering the pressure of the second flow channel (2) higher than that of the first flow channel (1), any bubble transfer from the first fluid to the second fluid is prevented, or bubbles within the second fluid are transferred into the first fluid to thereby attain deaeration.

4 Claims, 14 Drawing Sheets

(56) References Cited

U.S. PATENT DOCUMENTS

| | | | |
|---|---|---|---|
| 5,462,667 A | 10/1995 | Wollinsky et al. | |
| 5,902,747 A | 5/1999 | Nemser et al. | |
| 2004/0077075 A1* | 4/2004 | Jensen et al. | 435/297.2 |

FOREIGN PATENT DOCUMENTS

| JP | 05-103956 A | 4/1993 |
|---|---|---|
| JP | 3370407 B2 | 1/2003 |
| JP | 2005-214204 A | 8/2005 |
| JP | 2005-329333 A | 12/2005 |
| WO | WO-97/03354 A1 | 1/1997 |
| WO | WO-2004/05299 A1 * | 7/2004 |

OTHER PUBLICATIONS

International Search Report for the Application No. PCT/JP2005/024104 mailed Apr. 4, 2006.

Supplementary European Search Report for the Application No. EP 05 84 4825 dated Sep. 2, 2011.

* cited by examiner

METHOD FOR CONTROLLING PRESSURE-DIFFERENCE BUBBLE TRANSFER

TECHNICAL FIELD

The present invention relates to a method for controlling bubble transfer to remove bubbles of oxygen, carbon dioxide, and the like from a liquid containing few impurities, called pure water or ultrapure water, as well as water for medicine manufacture, process water for semiconductor manufacture, cooling water, boiler water, tap water, cell culture media, and the like, and to prevent the entry of bubbles into these various liquids from other liquids and apparatuses using the method, such as a gas exchange apparatus for introducing or removing a gas component(s) into or from a liquid, an electrical conductivity measuring apparatus for measuring the ion concentration of components of a liquid, an apparatus for measuring the total organic carbon content of sample solution, a reactor such as a microchip for synthesizing an organic substance from a very small amount of sample or a µTAS (Micro Total Analysis System) in which pretreatment functions are integrated, and a cell culture apparatus.

BACKGROUND ART

In a case where organic pollution of sample solution such as a liquid containing few impurities, called pure water or ultrapure water, water for medicine manufacture, or process water for semiconductor manufacture is evaluated, carbon dioxide dissolved in such sample solution needs to be removed. In general, a gas component such as carbon dioxide contained in a liquid sample is removed by vacuum degassing or bubbling with nitrogen gas or the like before the liquid sample is introduced into an analyzer.

However, in the case of degassing by bubbling, bubbles are formed in a liquid sample, and therefore, when the liquid sample containing bubbles is introduced into a micro flow channel of an analyzer or a reactor, bubbles are trapped in a part of the flow channel and cannot be easily removed. Further, in a case where bubbles are introduced into an ultraviolet absorption detector of a measuring apparatus, abnormal noises are generated by the bubbles, and in a case where bubbles are introduced into an electrical conductivity detector of a measuring apparatus, the electrical conductivity of a liquid sample cannot be accurately measured. Further, in a case where bubbles are introduced into a part of a reactor where mixing of a reaction solution or synthesis is carried out, the bubbles adversely affect the flow of the reaction solution, and therefore, mixing of the reaction solution cannot be stably carried out, thereby deteriorating reproducibility.

Even when bubbling is not carried out, there is a case where noises are generated by bubbles originally contained in a liquid sample. For this reason, bubbles contained in a liquid sample are preferably removed.

As a means for removing bubbles from a liquid sample, a gas exchange membrane can be used. Examples of the gas exchange membrane include gas permeable membranes and membrane filters.

A gas permeable membrane has a cross-sectional structure schematically shown by reference numeral 31 in FIG. 6A. In such a gas permeable membrane, gaps between molecules of the material thereof are present in random orientations, and a gas component(s) permeates (permeate) the gas permeable membrane through the gaps. The gas permeation rate of the gas permeable membrane is low, but the gas permeable membrane does not allow a liquid to pass through it.

On the other hand, a membrane filter has a cross-sectional structure schematically shown by reference numeral 32 in FIG. 6B. As shown in FIG. 6B, a membrane filter 32 has a number of pores 33 penetrating therethrough. The pores 33 include those formed so as not to intersect one another and those intersecting one another. Irrespective of the type of pore 33, the diameter of the pores 33 is much larger than that (those) of a gas component(s) that should pass through the membrane filter. Therefore, the membrane filter has a gas permeation rate much higher than that of a gas permeable membrane because a gas component(s) can move in the membrane filter at a diffusion rate(s). However, in this case, only the surface tension of the membrane filter prevents a liquid from passing through the membrane filter, and therefore if a liquid sending pressure exceeds the surface tension, the liquid permeates the membrane filter 32 through the pores 33.

As a gas exchange apparatus for removing a gas component(s) from a liquid or transferring a gas component(s) to dissolve it (them) into a liquid, one utilizing hollow fiber membranes is used. Such hollow fiber membranes are used in the form of a module in which a number of hollow fiber membranes are tied in a bundle and caps are provided at both ends of the bundle. Such a module is used in such a manner that a liquid is allowed to flow through hollow fiber membranes and a gas contained in the liquid is removed by external aspiration or a gas is allowed to dissolve in a liquid in the hollow fiber membranes by the application of pressure to an external gas (see Patent Document 1).

An example of a total organic carbon measuring apparatus for measuring the total organic carbon of sample solution includes one including an organic matter oxidative decomposition unit for converting organic carbon to carbon dioxide; a carbon dioxide separation unit for extracting carbon dioxide generated in the organic matter oxidative decomposition unit into deionized water; and a detection unit for measuring the electrical conductivity of the deionized water discharged from the carbon dioxide separation unit to quantify carbon dioxide extracted at the carbon dioxide separation unit.

In the carbon dioxide separation unit of such a total organic carbon measuring apparatus, a gas permeable membrane is provided so as to separate sample solution having been subjected to oxidation in the organic matter oxidative decomposition unit from deionized water so that carbon dioxide contained in the sample solution is transferred into the deionized water through the gas permeable membrane.

Patent Document 1: Japanese Patent No. 3370407

DISCLOSURE OF THE INVENTION

Problems to be Solved by the Invention

It is an object of the present invention to provide a method for controlling pressure-difference bubble transfer whereby bubbles in a flow channel can be removed and the entry of bubbles into a flow channel can be prevented and also to provide apparatuses using the method such as a gas exchange apparatus, an electrical conductivity measuring apparatus, a total organic carbon measuring apparatus, a reactor, and a cell culture apparatus.

Means for Solving the Problems

A method for controlling pressure-difference bubble transfer of the present invention includes: disposing a first flow channel for flowing a first fluid of liquid or gas and a second flow channel for flowing a second fluid of liquid with a gas exchange unit, through which a liquid cannot pass but a gas component(s) can pass, being interposed therebetween; and providing a pressure difference between the first and second flow channels with the gas exchange unit interposed therebetween, wherein the transfer of bubbles between the first and second flow channels is controlled.

The transfer of bubbles includes removal or entry of bubbles, or both.

A first embodiment of the control of bubble transfer is to prevent the entry of bubbles from the first fluid into the second fluid by making a pressure in the second flow channel higher than a pressure in the first flow channel.

A second embodiment of the control of bubble transfer is to remove bubbles from the second fluid by allowing bubbles contained in the second fluid to transfer into the first fluid by making a pressure in the second flow channel higher than a pressure in the first flow channel.

An example of a method for making a pressure in one flow channel higher than a pressure in the other flow channel includes connecting a flow channel resistance member, such as a resistance tube, downstream of one flow channel.

In a case where the concentration of carbon dioxide in sample solution is measured by the pressure-difference bubble transfer control method according to the present invention, sample solution containing carbon dioxide is allowed to flow as a first fluid through the first flow channel and deionized water, such as pure water or ion-exchanged water, is allowed to flow as a second fluid through the second flow channel. In this case, carbon dioxide is transferred from the first fluid into the second fluid while the transfer of bubbles between the first and second flow channels is controlled, and then the electrical conductivity of the second fluid is measured.

In a case where the method according to the present invention is applied to a cell culture apparatus, a liquid containing carbon dioxide and oxygen is allowed to flow as a first fluid through the first flow channel and a cell culture medium is allowed to flow as a second fluid through the second flow channel. In this case, carbon dioxide and oxygen are transferred from the first fluid into the second fluid while the entry of bubbles from the first fluid into the second fluid is prevented.

A gas exchange apparatus of the present invention includes: a gas exchange unit capable of performing gas exchange; a first flow channel being in contact with the gas exchange unit; and a second flow channel being in contact with the gas exchange unit and provided in such a manner that at least a part thereof is opposed to the first flow channel with the gas exchange unit being interposed therebetween, wherein the transfer of bubbles between the first and second flow channels is controlled by the pressure-difference bubble transfer control method according to the present invention.

An example of the gas exchange unit includes one having a membrane filter or gas permeable membrane having a number of pores penetrating therethrough and separating the first and second flow channels from each other.

A preferred example of the gas exchange unit achieving a gas component permeation rate higher than that of a gas permeable membrane and a liquid sending pressure higher than that of a membrane filter includes one constituted from a membrane filter having a number of pores penetrating therethrough and a gas permeable layer formed of a hydrophobic material on the membrane filter to prevent the transfer of a liquid through the pores of the membrane filter and to form gaps through which only a gas component(s) contained in the liquid can pass.

Another preferred example of the gas exchange unit includes one having a plurality of grooves connecting the first and second flow channels to each other. In this case, at least a part of the inner surface of each of the grooves is hydrophobized and the cross-sectional area of each of the grooves is determined so that a liquid cannot be transferred through the grooves but only a gas component(s) contained in the liquid can be transferred between the first and second channels through the grooves.

By reducing the size of a measuring apparatus by micromachining, it is possible to reduce the amount of a sample and the consumption of a regent. From such a viewpoint, a preferred embodiment of the gas exchange apparatus includes one in which a first substrate and a second substrate are stacked with the gas exchange unit being interposed therebetween, and the first flow channel is formed using the first substrate, and the second flow channel is formed using the second substrate.

The total organic carbon content of sample solution needs to be speedily measured because it is changed when carbon dioxide contained in air is dissolved in the sample solution. Therefore, an electrical conductivity measuring apparatus according to the present invention which can be used for a total organic carbon measuring apparatus is intended to be connected to the second flow channel of the gas exchange apparatus according to the present invention, and includes a third flow channel having a measuring cell in which an electrode for measuring the electrical conductivity of a liquid having passed through the second flow channel is provided. In the electrical conductivity measuring apparatus, deionized water is allowed to flow as measuring water through the second flow channel.

A total organic carbon measuring apparatus of the present invention includes: an organic matter oxidative decomposition unit for converting organic carbon contained in sample solution to carbon dioxide; a carbon dioxide separation unit for extracting carbon dioxide generated in the organic matter oxidative decomposition unit into deionized water as measuring water; and a detection unit for measuring the electrical conductivity of the measuring water discharged from the carbon dioxide separation unit to quantify carbon dioxide extracted at the carbon dioxide separation unit, wherein as the carbon dioxide separation unit and the detection unit, the electrical conductivity measuring apparatus according to the present invention is used, and wherein the sample solution discharged from the organic matter oxidative decomposition unit is introduced into the first flow channel.

A reactor of the present invention includes: a reaction flow channel having a reaction space for carrying out chemical reaction in a solution; and the gas exchange apparatus according to the present invention provided downstream of the reaction space of the reaction flow channel, wherein the reaction flow channel is connected to the second flow channel of the gas exchange apparatus, and wherein a pressure in the second flow channel is made higher than a pressure in the first flow channel to transfer a gas generated in the reaction flow channel into the first flow channel to remove the gas from the reaction flow channel.

A cell culture apparatus of the present invention includes: a cell culture chamber; a cell culture medium flow channel for introducing a cell culture medium into the cell culture chamber; and the gas exchange apparatus according to the present invention provided upstream of the cell culture chamber, wherein the cell culture medium flow channel is connected to the second flow channel of the gas exchange apparatus to introduce a cell culture medium through the second flow channel into the cell culture chamber, and wherein when a liquid containing carbon dioxide and oxygen is allowed to flow through the first flow channel and a pressure in the second flow channel is made higher than a pressure in the first flow channel, the concentrations of oxygen and carbon dioxide in the cell culture medium are regulated while the transfer of bubbles from the first flow channel into the cell culture medium flowing through the second flow channel is suppressed.

Effect of the Invention

According to the pressure-difference bubble transfer control method of the present invention, by providing a difference in liquid sending pressure between the two flow channels provided with the gas exchange unit being interposed therebetween, it is possible to control the transfer of bubbles between the two flow channels. This makes it possible to eliminate the influence of bubbles which will interfere with measurement (e.g., measurement of electrical conductivity) or reaction (e.g., mixing of a reaction liquid or synthesis) and thereby to improve the accuracy and reproducibility of measurement.

More specifically, by providing a difference in liquid sending pressure between the first flow channel and the second flow channel, it is possible to prevent the entry of bubbles into the second flow channel or to remove bubbles from the second flow channel.

A pressure in one flow channel can be easily increased by for example, connecting a flow channel resistance member downstream of the flow channel. In this case, pressure control is also easily carried out. An example of the flow channel resistance member includes a resistance tube.

In a case where sample solution containing carbon dioxide is allowed to flow through the first flow channel and deionized water is allowed to flow through the second flow channel to transfer carbon dioxide into the second flow channel, by further making a pressure in the second flow channel higher than a pressure in the first flow channel, it is possible to prevent the transfer of bubbles into the deionized water flowing through the second flow channel. In this case, by introducing the deionized water flowing through the second flow channel into a measuring cell for measuring electrical conductivity it is possible to accurately measure the electrical conductivity of the deionized water without the influence of bubbles.

In a case where a solution (first fluid) containing carbon dioxide and oxygen is allowed to flow through the first flow channel and a cell culture medium (second fluid) is allowed to flow through the second flow channel to transfer carbon dioxide and oxygen from the first fluid into the second fluid, by further making a pressure in the second flow channel higher than a pressure in the first flow channel, it is possible to regulate the concentrations of carbon dioxide and oxygen in the second fluid without the influence of bubbles and thereby to keep the cell culture medium in its optimum conditions.

The pressure-difference bubble transfer control method according to the present invention can be implemented by a gas exchange apparatus according to the present invention including a gas exchange unit, a first flow channel and a second flow channel.

The gas exchange unit can be realized by using a membrane filter or a gas permeable membrane. However, by constituting the gas exchange unit from a membrane filter and a gas permeable layer made of a hydrophobic material or by allowing the gas exchange unit to have a plurality of grooves connecting the first and second flow channels to each other, through which a liquid cannot be transferred but only a gas component(s) contained in the liquid can be transferred, it is possible for the gas exchange unit to achieve a gas component permeation rate higher than that of a gas permeable membrane and a liquid sending pressure higher than that of a membrane filter.

By producing the gas exchange apparatus using first and second substrates stacked together, it is possible not only to reduce the size of the gas exchange apparatus but also to eliminate the necessity to use a member for connecting flow channels, thereby preventing the entry of foreign matter derived from such a connecting member.

By connecting to the gas exchange apparatus according to the present invention, a third flow channel having a measuring cell in which an electrode for measuring the electrical conductivity of a fluid having passed through the second flow channel of the gas exchange apparatus is provided, it is possible to easily provide an electrical conductivity measuring apparatus capable of measuring the electrical conductivity of a fluid while suppressing the influence of bubbles.

By using the conductivity measuring apparatus according to the present invention as a carbon dioxide separation unit and a detection unit of a total organic carbon measuring apparatus, it is possible to provide a total organic carbon measuring apparatus capable of accurately measuring total organic carbon while suppressing the influence of bubbles.

By connecting the gas exchange apparatus according to the present invention to a reactor, it is possible to remove a gas generated in a reaction flow channel and thereby to accurately measure a reaction product.

By using the gas exchange apparatus according to the present invention in a cell culture apparatus, it is possible to regulate the concentrations of carbon dioxide and oxygen in a cell culture medium (second fluid) without the influence of bubbles and thereby to maintain the cell culture medium in its optimum conditions.

BEST MODE FOR CARRYING OUT THE INVENTION

Hereinbelow, an electrical conductivity measuring apparatus, total organic carbon measuring apparatus, and cell culture apparatus according to the present invention and a method for controlling pressure-difference bubble transfer to be applied to these apparatuses will be described in detail.

EXAMPLE 1

FIG. 1A is a plan view showing the flow channel configuration of a gas exchange chip according to a first example of the present invention to be used as a gas exchange apparatus in various apparatuses according to the present invention, and FIG. 1B is a sectional view taken along the X-X' line in FIG. 1A.

The gas exchange chip includes a first substrate 11, a second substrate 12, and a gas exchange unit 5, and the first substrate 11 and the second substrate 12 are bonded together with the gas exchange unit 5 being interposed therebetween.

Examples of the substrates 11 and 12 include, but are not limited to, glass substrates such as silica glass substrates. In one of the surfaces of the first substrate 11, a first flow channel 1 whose width and depth are each 1000 μm or less is formed. At both ends of the first flow channel 1, through holes 6 and 7 are formed to introduce and discharge a first fluid of liquid or gas into and from the first flow channel 1. Also in one of the surfaces of the second substrate 12, a second flow channel 2 whose width and depth are each 1000 μm or less is formed. Also at both ends of the second flow channel 2, through holes 8 and 9 are formed to introduce and discharge a second fluid of liquid into and from the second flow channel 2. In the gas exchange chip according to the first example of the present invention, the width and depth of each of the flow channels 1 and 2 are set to, for example, 1 mm and 100 μm, respectively.

Further, the through holes 6 and 7 formed in the substrate 11 are defined as an inlet and an outlet, respectively and the through holes 8 and 9 formed in the substrate 12 are defined as an inlet and an outlet, respectively.

The gas exchange unit 5 is, for example, a fluorocarbon resin porous membrane having a plurality of pores. Examples of the gas exchange unit 5 will be described later in detail with reference to other examples. The gas exchange chip according to the first example of the present invention is produced by interposing the gas exchange unit 5 between the substrates 11 and 12 so that the flow channels 1 and 2 are opposed to each other and then bonding the substrates 11 and 12 and the gas exchange unit 5 together.

When the gas exchange chip is used, a tube is connected to each of the channels 1 and 2. In order to provide a pressure difference between the flow channels 1 and 2, a tube having a large inner diameter (e.g., a PTFE (polytetrafluoroethylene) tube having an inner diameter of 0.5 mm and a length of 1 m) is connected to the through hole 7 provided on the downstream side of the flow channel 1, and a tube having a small inner diameter (e.g., a PTFE tube having an inner diameter of 0.25 mm and a length of 1 m) is connected as a resistance tube 3 to the through hole 9 provided on the downstream side of the flow channel 2. The resistance tube 3 is one example of a flow channel resistance member.

Sample solution containing carbon dioxide is allowed to flow through the flow channel 1, and pure water that is deionized water as measuring water is allowed to flow through the flow channel 2. When the sample solution and the pure water are allowed to flow at the same flow rate, a difference in liquid sending pressure is provided between the flow channels 1 and 2 due to a difference in flow channel resistance between the flow channels 1 and 2.

FIGS. 2A to 2D are schematic views showing the effect of a difference in liquid sending pressure (second flow channel>first flow channel) provided in the gas exchange chip.

FIG. 2A is a schematic view of the gas exchange chip in which carbon dioxide-containing sample solution (containing bubbles 10) is allowed to flow as a first fluid through the first flow channel 1 and pure water (not containing bubbles) is allowed to flow as a second fluid through the second flow channel 2. In this case, a liquid sending pressure is higher in the flow channel 2 than in the flow channel 1, and therefore carbon dioxide contained in the sample solution flowing through the flow channel 1 is transferred through the gas exchange unit 5 into the pure water flowing through the flow channel 2 without the entry of the bubbles 10 contained in the sample solution flowing through the flow channel 1 into the pure water flowing as measuring water through the flow channel 2.

FIG. 2B is the same as FIG. 2A except that the pure water flowing as measuring water through the flow channel 2 contains bubbles 10. In this case, the bubbles 10 contained in the measuring water flowing through the flow channel 2 are removed by allowing them to transfer through the gas exchange unit 5 into the sample solution flowing through the flow channel 1, and carbon dioxide contained in the sample solution flowing through the flow channel 1 is transferred through the gas exchange unit 5 into the pure water flowing through the flow channel 2.

FIG. 2C is a schematic view showing the gas exchange chip in which air is allowed to flow as a first fluid through the flow channel 1, and pure water (not containing bubbles) as measuring water is allowed to flow as a second fluid through the flow channel 2. In this case, a gas component such as carbon dioxide contained as a measuring object in the air flowing through the flow channel 1 is transferred through the gas exchange unit 5 into the pure water flowing through the flow channel 2 without the entry of bubbles from the air flowing through the flow channel 1 into the pure water flowing as measuring water through the flow channel 2.

FIG. 2D is the same as FIG. 2C except that the pure water flowing as measuring water through the flow channel 2 contains bubbles 10. In this case, the bubbles 10 contained in the pure water flowing as measuring water through the flow channel 2 are removed by allowing them to transfer through the gas exchange unit 5 into the air flowing through the flow channel 1, and a gas component such as carbon dioxide contained as a measuring object in the air flowing through the flow channel 1 is transferred through the gas exchange unit 5 into the pure water flowing through the flow channel 2.

Hereinbelow, measurement results for evaluating the effect of a difference in liquid sending pressure will be described.

The gas exchange chip shown in FIG. 1 is used for measurement, and a PTFE porous membrane (manufactured by Sumitomo Electric Fine Polymer Inc.) having an average pore size of 0.05 μm is used as the gas exchange unit 5. A pressure meter and an electrical conductivity meter are connected to a tube connected to the outlet 9 of the flow channel 2, and a PTFE tube having an inner diameter of 0.25 mm is further connected as the resistance tube 3 downstream of the pressure meter and the electrical conductivity meter to apply a back pressure to the flow channel 2. The back pressure to be applied to the flow channel 2 is controlled by changing the length of the PTFE tube in the range of 750 to 1350 mm. On the other hand, such a resistance tube is not connected to the flow channel 1, and therefore the back pressure applied as a flow channel resistance by the resistance tube 3 to the flow channel 2 is substantially equal to a pressure difference between the flow channels 1 and 2.

Water which has been subjected to bubbling to reach equilibrium with the atmosphere is allowed to flow through the flow channel 1 at a flow rate of 100 μL/min, and pure water is allowed to flow through the flow channel 2 at a flow rate of 100 μL/min.

FIG. 3 is a graph showing the relationship among the length of the resistance tube 3, the number of bubbles determined under the conditions described above based on the fluctuation of the electrical conductivity values of the pure water measured by the electrical conductivity meter connected downstream of the flow channel 2, and a back pressure applied to the flow channel 2. In this measurement, a sudden change in the electrical conductivity of the pure water measured by the electrical conductivity meter is considered as a sign of the detection of a bubble, and then a count of the number of bubbles is increased by one. In this case, the bubble detected in the pure water flowing through the flow channel 2 is one which has been transferred through the gas exchange unit 5 from the water flowing through the flow channel 1.

As can be seen from the results shown in FIG. 3, a bubble is detected when a pressure difference between the flow channels 1 and 2 is small, but transfer of bubbles is stopped by increasing a pressure difference between the flow channels 1 and 2 by increasing the length of the resistance tube 3 and then no bubbles are detected. In the case of the gas exchange chip according to the first example of the present invention, transfer of bubbles does not occur when a pressure difference between the flow channels 1 and 2 is about 10 kPa or higher.

FIG. 4 is a graph showing the fluctuation of the electrical conductivity values of the pure water measured by the electrical conductivity meter. In this case, the electrical conductivity of the pure water is measured while a pressure difference between the first and second flow channels is changed. During the measurement of the electrical conductivity of the pure water, a pressure difference between the first and second flow channels is kept at 0 at first, and is then kept at 15 kPa, and is again kept at 0. As can be seen from the results shown in FIG. 4, the electrical conductivity of the pure water widely fluctuates due to the influence of bubbles when a pressure difference is not provided between the first and second flow channels, whereas when a pressure difference between the first and second flow channels is kept at 15 kPa, bubbles are not transferred into the pure water and therefore the conductivity of the pure water is kept almost constant.

FIG. 5 is a graph showing the relationship between a pressure difference between the flow channels 1 and 2 and the electrical conductivity of the measuring water flowing through the flow channel 2. As can be seen from FIG. 5, the length of the resistance tube 3 is in proportional relation with a pressure difference between the flow channels 1 and 2, but the electrical conductivity of the measuring water does not depend on a pressure difference between the flow channels 1 and 2. From the result, it has been confirmed that transfer of bubbles from the first channel into the second channel can be prevented by increasing a difference in liquid sending pressure between the first and second channels, and transfer of carbon dioxide from the first channel into the second channel can be carried out without the influence of the liquid sending pressure difference. From these measurement results, it has been found that the pressure difference between the flow channels 1 and 2 makes it possible to eliminate the influence of bubbles on measurement and thereby to improve the accuracy and reproducibility of measurement.

EXAMPLE 2

Hereinbelow, a second example of the gas exchange apparatus according to the present invention using a gas permeable membrane or a membrane filter as the gas exchange unit will be described. Although not described in this and the following examples, a means for providing a pressure difference between two flow channels, between which the gas exchange unit is interposed, is also provided in each of the gas exchange apparatuses.

In a case where a gas permeable membrane is singly used as the gas exchange unit, a hydrophobic porous membrane is preferably used. For example, a porous fluorocarbon resin membrane (e.g., Poreflon® manufactured by Sumitomo Electric Industries, Ltd.) can be used.

In a case where a membrane filter is singly used as the gas exchange unit, a polycarbonate membrane filter having a thickness of 10 μm, a pore size of 0.2 μm, and a porosity of 5 to 20% (e.g., ISOPORE MEMBRANE FILTER manufactured by MILLIPORE) can be used.

EXAMPLE 3

Hereinbelow, a third example of the gas exchange apparatus according to the present invention using, as the gas exchange unit, a membrane filter having a gas permeable layer formed on the surface thereof will be described.

In a case where the gas exchange unit of the gas exchange apparatus according to the third example of the present invention is constituted from a membrane filter having a gas permeable layer formed on both surfaces thereof, such a gas exchange unit has a structure schematically shown in any one of FIGS. 6C to 6E or a structure obtained by combining two or more structures shown in FIGS. 6C to 6E.

In the case of the structure shown in FIG. 6C, pores 33 of a membrane filter 32 are roughly filled with a gas permeable layer 34 formed of a hydrophobic material, and therefore, transfer of a liquid through the pores 33 is prevented, but a gas component(s) contained in the liquid can be transferred through gaps formed in the gas permeable layer 34.

In the case of the structure shown in FIG. 6D, the diameter of pores 33 of a membrane filter 32 is made smaller by a gas permeable layer 35 formed of a hydrophobic material, and therefore, transfer of a liquid through the pores 33 is prevented but a gas component(s) contained in the liquid can be transferred through gaps formed in the gas permeable layer 35.

In the case of the structure shown in FIG. 6E, the surface of a membrane filter 32 is coated with a thin gas permeable layer 36 formed of a hydrophobic material, and therefore, the gas permeable layer 36 prevents the transfer of a liquid through pores 33 formed in the membrane filter 32, but a gas component(s) contained in the liquid can be transferred through gaps formed in the gas permeable layer 36.

In the case of the structure shown in FIG. 6C or 6D, the size of the gaps formed in the gas permeable layer 34 or the diameter of the pores 33 in the membrane filter 32 which is made smaller by the gas permeable layer 35 is larger than the size of gaps between molecules formed in a conventional gas permeable membrane, and therefore, a gas component(s) can move in the membrane at a diffusion rate(s). Further, as described above, the diameter of the pores 33 of the structure shown in FIG. 6C or 6D is made smaller than that of the pores 33 of the membrane filter 32 not having the gas permeable layer, and therefore, the effect of surface tension is enhanced, thereby making it possible to raise the upper limit of a liquid sending pressure which can be applied to a liquid.

In the case of the structure shown in FIG. 6E, a gas component(s) passes (pass) through gaps between the molecules of the material of the gas permeable layer 36 as in the case of a conventional gas permeable membrane. However, in this case, the time required for allowing a gas component(s) to pass through the gas permeable membrane 36 is shortened because the thickness of the gas permeable layer 36 can be made smaller than that of a gas permeable membrane produced by a conventional method.

A preferred example of the membrane filter includes one having pores penetrating therethrough in a direction perpendicular to the surface thereof, and an example of the gas permeable layer includes a fluorine-based deposited thin film. By using a membrane filter having pores not intersecting with one another, it is possible to reduce gas diffusion in the membrane filter and thereby to increase the transfer rate(s) of a gas component(s).

The gas exchange apparatus according to the third example of the present invention can use a polycarbonate membrane filter. The material of the membrane filter itself may be either hydrophobic or hydrophilic because the surface of the membrane filter is to be coated with a gas permeable layer formed of a hydrophobic material. The pore size of the membrane filter is not particularly limited, but if it is too large, liquid leakage is likely to occur. For this reason, the pore size of the membrane filter is selected so that liquid leakage will not occur when the membrane filter is coated with the gas permeable layer. On the other hand, if the pore size of the membrane filter is too small, the gas permeation rate of the membrane filter coated with the gas permeable layer is decreased.

FIGS. 7A and 7B show one example of a membrane filter usable as the gas exchange unit of the gas exchange chip according to the present invention. FIG. 7A is an SEM image of the membrane filter without a gas permeable layer, and FIG. 7B is an SEM image of the membrane filter whose front and back surfaces are both coated with a gas permeable layer formed of a hydrophobic material to prevent the transfer of a liquid through the pores of the membrane filter and to form gaps through which only a gas component(s) contained in the liquid can pass. In this case, the membrane filter is subjected to plasma treatment using $CHF_3$ as a reaction gas to form a fluorocarbon layer as a gas permeable layer on both surfaces thereof. The plasma treatment for forming a fluorocarbon layer is carried out under conditions where a gas flow rate is 50 sccm, a film formation pressure is 150 mTorr, a film formation time is 5 minutes per surface, and an applied power is 100 W. A film formation rate is about 16 to 18 nm/min and the thickness of a formed fluorocarbon layer is about 80 to 90 nm.

The hydrophobization of the thus obtained gas permeable filter is evaluated by measuring a contact angle between the surface of the membrane filter and a water droplet. The contact angle of the membrane filter which has not been subjected to plasma treatment (i.e., the membrane filter shown in FIG. 7A) is 51°, but the contact angle of the membrane filter which has been subjected to plasma treatment (i.e., the membrane filter shown in FIG. 7B) is increased to 96°. From the result, it has been confirmed that the gas permeable filer has been hydrophobized.

EXAMPLE 4

Hereinbelow, a fourth example of the gas exchange apparatus according to the present invention having a plurality of grooves formed between two flow channels will be described.

The gas exchange apparatus according to the fourth example of the present invention uses a resin membrane as a gas exchange unit 5. The resin membrane has fine holes penetrating therethrough in its thickness direction but not intersecting with one another. This membrane is formed by for example, irradiating a polycarbonate thin membrane with neutrons in a direction perpendicular to the surface thereof to form a plurality of holes having a diameter of 1 µm or less and then hydrophobizing at least a part of each of the holes. Hydrophobization can be carried out by fluorinating the inner surface of each of the holes by a RIE (reactive ion etching) process using the flow of a fluorine compound gas such as $CHF_3$ gas or $CF_4$ gas or by decomposition of the fluorine compound gas by light irradiation with an excimer laser. In this case, it is not easy to fluorinate the inside of the holes. However, it is not always necessary to fluorinate the inside of the holes as long as at least an entrance of each of the holes is hydrophobized to prevent the entry of a liquid into the holes.

By reducing the width and depth of a flow channel for flowing a liquid by micromachining, it is possible to reduce the distance between the groove and the flow channel for flowing a liquid and thereby to reduce a distance over which a gas contained in the liquid travels from the flow channel to the groove or a distance over which a gas travels from the groove to the liquid flowing through the flow channel. This makes it possible to carry out the transfer of a gas to be exchanged or extracted in a short period of time and to treat a sample with a small amount of reagent, thereby reducing the size of the gas exchange apparatus and the consumption of a reagent.

EXAMPLE 5

Hereinbelow, a gas exchange chip having a plurality of grooves will be described as a fifth example of the gas exchange apparatus according to the present invention with reference to FIGS. 8A and 8B. FIG. 8A is a plan view showing the configuration of flow channels and grooves, and FIG. 8B is a sectional view taken along the X-X' line in FIG. 8A.

Reference numerals 11a and 12a denote glass substrates, for example, silica glass substrates. In one surface of the substrate 12a, first and second flow channels 1a and 2a each having a width and a depth of 1000 µm or less, preferably several hundred micrometers or less are formed. In one surface of the substrate 11a, a plurality of grooves 5a having a hydrophobic surface are formed at positions at which the flow channels 1a and 2a are connected to each other. In the substrate 11a at positions corresponding to the both ends of the flow channels 1a and 2a, through holes 6a, 7a, 8a, and 9a for use in introduction and discharge of a liquid or a gas are formed.

The substrates 11a and 12a are opposed to each other so that the surface of the substrate 11a having the grooves 5a and the surface of the substrate 12a having the flow channels 1a and 2a face each other, and are then bonded together into a single unit so that the holes 6a, 7a, 8a, and 9a are located at both ends of the flow channels 1a and 2a and the grooves 5a are located so as to connect the flow channels 1a and 2a to each other.

The length and width of each of the grooves 5a are several hundred micrometers or less, and the width and height of each of the grooves 5a are preferably 10 µm or less. When a liquid is allowed to flow through one or both of the flow channels 1a and 2a, the liquid does not enter the grooves 5a, but a gas is transferred between the flow channels 1a and 2a through the grooves 5a.

Such flow channels 1a and 2a and grooves 5a can be formed by for example, micromachining using photolithography and etching, and the holes 6a to 9a can be formed by for example, sandblasting. Hydrophobization of the inner surface of each of the grooves 5a can be carried out in the same manner as in the example 4.

The substrates 11a and 12a can be bonded together by hydrofluoric acid bonding. In hydrofluoric acid bonding, a 1% aqueous hydrofluoric acid solution is interposed between the substrates 11a and 12a, and the substrates 11a and 12a are allowed to stand in this state at room temperature for about 24 hours. At this time, if necessary, a load of about 1 MPa may be imposed on the substrates 11a and 12a.

For example, when sample solution containing carbon dioxide is allowed to flow through the flow channel 1a and pure water is allowed to flow through the flow channel 2a in the gas exchange apparatus to which a resistance tube or the like is connected to make a pressure in the flow channel 2a higher than a pressure in the flow channel 1a, carbon dioxide is transferred from the flow channel 1a through the grooves 5a into the flow channel 2a due to concentration gradient, but even when the sample solution contains bubbles, the bubbles are not transferred into the flow channel 2a.

EXAMPLE 6

Hereinbelow, another gas exchange chip having a plurality of grooves will be described as a sixth example of the gas exchange apparatus according to the present invention with reference to FIGS. 9A and 9B. FIG. 9A is a plan view showing the configuration of flow channels and grooves, and FIG. 9B is a sectional view taken along the X-X' line in FIG. 9A.

Substrates 11b and 12b are silicon substrates. On one surface of the substrate 12b, a first flow channel 1b, a second flow channel 2b and a plurality of grooves 5b having a hydrophobic surface and connecting the flow channels 1b and 2b to each other are formed. In the substrate 11b at positions corresponding to both ends of the flow channels 1b and 2b, through holes 6b, 7b, 8b, and 9b for use in introduction and discharge of a liquid or a gas are formed.

The substrates 11b and 12b are opposed to each other so that the surface having the flow channels 1b and 2b and the grooves 5b is inside, and are then bonded together into a single unit so that the through holes 6b, 7b, 8b, and 9b are located at both ends of the flow channels 1b and 2b.

The dimensions of the flow channels 1b and 2b and the grooves 5b are the same as those of the example 5, and the formation of the flow channels 1b and 2b, the grooves 5b and the holes 6b to 9b, and the hydrophobization of the inner surface of the grooves 5b can be carried out in the same manner as in the example 4. The substrates 11b and 12b can be bonded together by hydrofluoric acid bonding using oxide film formed on the surfaces thereof.

Also in the case of the gas exchange apparatus according to the sixth example of the present invention, when sample solution containing carbon dioxide is allowed to flow through the flow channel 1b and pure water is allowed to flow through the flow channel 2b to which a resistance tube or the like is connected to make a pressure in the flow channel 2b higher than a pressure in the flow channel 1b, carbon dioxide is transferred from the flow channel 1b through the grooves 5b into the flow channel 2b due to concentration gradient, but even when the sample solution contains bubbles, the bubbles are not transferred into the flow channel 2b.

EXAMPLE 7

FIG. 10 shows a total organic carbon measuring apparatus according to a seventh example of the present invention using the gas exchange apparatus according to the present invention described above with reference to the above examples.

The total organic carbon measuring apparatus includes an IC (inorganic carbon) removing unit 41 for removing carbon dioxide originally dissolved in sample solution, an organic matter oxidative decomposition unit 44 for converting organic carbon contained in sample solution into carbon dioxide, a carbon dioxide separation unit 46 for extracting carbon dioxide generated in the organic matter oxidative decomposition unit 44 into pure water as measuring water, and a detection unit 47 for measuring the electrical conductivity of the pure water discharged from the carbon dioxide separation unit 46 to quantify carbon dioxide extracted by the carbon dioxide separation unit 46. The total organic carbon measuring apparatus uses the gas exchange chip according to the first example of the present invention as the carbon dioxide separation unit 46. In this case, sample solution discharged from the organic matter oxidative decomposition unit 44 is allowed to flow through the first flow channel of the double-flow channel type gas exchange chip and pure water is allowed to flow through the second flow channel, and the pure water discharged from the gas exchange chip is introduced into the detection unit 47.

The IC removing unit 41 has a vacuum pump 43 and a hydrophobic porous membrane 42 provided between the vacuum pump 43 and sample solution. By reducing pressure in the IC removing unit 41 using the vacuum pump 43, carbon dioxide contained in sample solution passes through the hydrophobic porous membrane 42 and is removed. The organic matter oxidative decomposition unit 44 has a UV (ultraviolet) lamp 45, and a flow channel is wound around the UV lamp 45. Therefore, sample solution is oxidized by UV energy emitted from the UV lamp 45 while passing through the flow channel. It is preferred that a catalyst (e.g., titanium oxide) is applied onto the inner surface of the flow channel of the organic matter oxidative decomposition unit 44.

In the carbon dioxide separation unit 46, a tube having a large inner diameter (e.g., a PTFE tube having an inner diameter of 0.5 mm and a length of 1 m) for discharging sample solution is connected to the gas exchange chip. On the other hand, a tube having a small inner diameter (e.g., a PTFE tube having an inner diameter of 0.25 mm and a length of 1 m) is connected as a resistance tube downstream of the detection unit 47 in a flow channel for flowing pure water through the gas exchange chip 46 into the detection unit 47.

In the total organic carbon measuring apparatus shown in FIG. 10, an acid such as hydrochloric acid is added to sample solution containing organic matter, and then pressure in the IC removing unit 41 is reduced using the vacuum pump 43 to allow carbon dioxide to pass through the hydrophobic porous membrane 42 to remove carbon dioxide from the sample solution. Since carbon dioxide dissociates in water, it is difficult to remove carbon dioxide from water. Therefore, in order to prevent dissociation of carbon dioxide, an acid is added to sample solution.

Then, the sample solution is introduced into the organic matter decomposition unit 44. In the organic matter decomposition unit 44, organic matter contained in the sample solution, from which carbon dioxide has been removed, is oxidized by UV energy emitted from the UV lamp 45 and is therefore converted to carbon dioxide. In a case where the sample solution contains an oxidizing agent or a catalyst is applied onto the inner surface of the flow channel, the organic matter contained in the sample solution is more effectively oxidized due to the effect of the oxidizing agent or the catalyst. The sample solution containing dissolved carbon dioxide generated by oxidative decomposition of the organic matter is introduced into the gas exchange chip of the carbon dioxide separation unit 46. In the carbon dioxide separation unit 46, carbon dioxide contained in the sample solution is transferred into pure water (i.e., into a second fluid). The pure water is introduced into the detection unit 47. In the detection unit 47, the electrical conductivity of the pure water is measured to determine the concentration of carbon dioxide.

As described above, since the resistance tube is connected downstream of the detection unit 47, a difference in liquid sending pressure is generated between the flow channel for flowing sample solution and the flow channel for flowing measuring water in the gas exchange chip of the carbon dioxide separation unit 46. Therefore, carbon dioxide is transferred from the sample solution containing carbon dioxide into the pure water without the transfer of bubbles. This makes it possible to measure the electrical conductivity of the pure water with stability without the influence of bubbles. Further, even when air enters the sample solution by mistake when the sample solution is introduced into the total organic carbon measuring apparatus, bubbles do not reach the detection unit 47 and are therefore not trapped in the detection unit 47. This makes it easy to carry out remeasurement.

EXAMPLE 8

FIG. 11 is a sectional view schematically showing another example of the total organic carbon measuring apparatus according to the present invention using the gas exchange apparatus according to the present invention described above with reference to the above examples.

The total organic carbon measuring apparatus shown in FIG. 11 is formed as a single unit in which a gas exchange chip used as a gas exchange apparatus is sandwiched between an organic matter oxidation unit provided on the upper side of the gas exchange chip and an electrical conductivity measuring unit provided on the lower side of the gas exchange chip.

The gas exchange chip includes a gas exchange unit 5c, a first substrate 11c with which the gas exchange unit 5c forms a first flow channel 1c, and a second substrate 12c for forming a second flow channel 2c opposed to the first flow channel 1c with the gas exchange unit 5c being interposed therebetween. The gas exchange chip is formed by stacking the second substrate 12c, the gas exchange unit 5c, and the first substrate 11c in this order and fixing them together.

The electrical conductivity measuring unit includes a third substrate 13c and an electrode 7 for measuring electrical conductivity. The third substrate 13c is fixed to the second substrate 12c so that they are opposed to each other to form, between the second substrate 12c and the third substrate 13c, a measuring cell connected to the second flow channel 2c. The electrode 7 for measuring electrical conductivity is arranged in the measuring cell. One end of a flow channel 16 provided in the measuring cell is connected to the second flow channel 2c through a though hole 9c, and the other end of the flow channel 16 is connected to a discharge port 24 provided as a through hole in the substrate 13c.

In the third substrate 13c, a flow channel 23 for supplying ion-exchanged water as measuring water (second fluid) is provided as a through hole. The flow channel 23 is connected to the second flow channel 2c through a through hole 8c provided in the substrate 12c, and is also connected to a discharge port 25c provided as a through hole through a branching flow channel 15 formed by the second and third substrates 12c and 13c.

The optimum flow rate of ion-exchanged water for keeping the quality of the ion-exchanged water is larger than the flow rate of measuring water required by the gas exchange chip. Therefore, the total organic carbon measuring apparatus according to the eighth example of the present invention has the branching flow channel 15 provided between the second and third substrates 12c and 13c to allow ion-exchanged water to flow into a flow channel other than the second flow channel 2c. By providing such a branching flow channel 15, it is possible to regulate the flow rate of measuring water to be supplied to the second flow channel 2c while the optimum flow rate of ion-exchanged water is kept to keep the quality of the ion-exchanged water.

The organic matter oxidation unit has a fourth substrate 14c fixed to the first substrate 11c so that they are opposed to each other. Between the fourth substrate 14c and the first substrate 11c, an oxidation flow channel 19 is formed. The fourth substrate 14c is made of a transparent material so that ultraviolet rays can enter at least a part of the oxidation flow channel 19 from the outside.

One end of the oxidation flow channel 19 is connected to a flow channel 21 provided as a through hole to supply a first fluid (sample solution), and the other end of the oxidation flow channel 19 is connected to the first flow channel 1c through a through hole 6c provided in the substrate 11c. The first flow channel 1c is connected to a through hole 7c, provided in the substrate 11c to discharge sample solution, and to a discharge port 22 provided as a through hole in the substrate 14c.

In order to make a pressure in the second flow channel 2c higher than a pressure in the first flow channel 1c, a resistance tube is connected downstream of each of the discharge ports 24 and 25.

A junction 17 between the substrate 11c and the substrate 12c and a junction 18 between the substrate 12c and the substrate 13c are sealed with a PDMS (polydimethylsiloxane) film, an adhesive organic film, or an adhesive-coated thin sheet or film.

As described above, by further providing a transparent substrate, through which ultraviolet rays can pass, on the gas exchange chip to form an oxidation flow channel, it is possible to combine an organic matter oxidation unit, a gas exchange unit and an electrical conductivity measuring unit into a single unit, thereby further reducing the size of the total organic carbon measuring apparatus. In addition, it is also possible to speedily measure total organic carbon having been converted to carbon dioxide, thereby improving measurement accuracy.

The operation of measuring the concentration of organic matter using the total organic carbon measuring apparatus according to the eighth example of the present invention will be described with reference to FIG. 11.

As an example of sample solution, an aqueous potassium hydrogen phthalate solution is used.

The sample solution is supplied at a flow rate of about 0.1 mL/min through the flow channel 21 to the oxidation flow channel 19. Then, the sample solution is irradiated with UV rays for 0.1 to 5 minutes, preferably 3 minutes to oxidize organic matter contained therein. The organic matter is oxidized to carbon dioxide, and the carbon dioxide is dissolved in the sample solution.

Ion-exchanged water is supplied from an ion-exchanged water producing apparatus or the like through the flow channel 23 at a flow rate in the range of 0.1 to 10 mL/min. In this example, the ion-exchanged water is supplied at a flow rate of 2 mL/min. However, since the flow rate of the ion-exchanged water required for measuring the electrical conductivity of the ion-exchanged water is very low, the redundant ion-exchanged water supplied through the flow channel 23 is discharged through the branching flow path 15 and the discharge port 25 to regulate the flow rate of measuring water. By providing the branching flow channel 15 and the discharge port 25, it is possible not only to regulate the flow rate of measuring water to be supplied to the second flow channel 2c (e.g., 0.1 mL/min) but also to supply ion-exchanged water at an optimum flow rate (e.g., 1.9 mL/min) for keeping the quality of the ion-exchanged water.

The sample solution containing dissolved carbon dioxide derived from organic matter is introduced into the first flow channel 1c through the through hole 6c, and then carbon dioxide contained in the sample solution is transferred through the gas exchange unit 5c into the ion-exchanged water flowing through the second flow channel 2c. It is to be noted that even if the sample solution contains bubbles, the bubbles are not transferred into the measuring water flowing through the second flow channel 2c because a pressure in the second flow channel 2c is higher than that in the first flow channel 1c.

After the completion of gas transfer through the gas exchange unit 5, the sample solution is discharged through the through hole 7c and the discharge port 22. The measuring water containing carbon dioxide is introduced into the measuring cell through the through hole 9c. Then, the measuring water is allowed to flow through the flow channel 16 to measure the electrical conductivity of the ion-exchanged water using the electrode 7.

The electrical conductivity of a control sample containing neither organic matter nor carbon dioxide is also measured to determine a background electrical conductivity. Then, the background electrical conductivity is subtracted from the electrical conductivity of the sample solution, and the carbon dioxide content of the sample solution is determined from the thus obtained electrical conductivity and converted to a total organic carbon content.

The total organic carbon measuring apparatus shown in FIG. 11 is merely an example, and the materials of the substrates and the sealing material are not particularly limited as long as the same functions can be achieved. Further, the total organic carbon measuring apparatus according to the eighth example of the present invention is not limited to one constituted from the four substrates 11c, 12c, 13c, and 14c, and also includes, for example, one constituted from only the substrates 11c, 12c, and 13c and one constituted from only the substrates 11c and 12c.

Further, the substrate structure of the total organic carbon measuring apparatus according to the eighth example of the present invention is not limited to a vertical type one shown in FIG. 11, and may be a horizontal type one. For example, the fourth substrate and the third substrate may be arranged in a horizontal direction relative to the first and second substrates so as to be adjacent to the first and the second substrates, thereby making it possible to reduce the height of the apparatus.

In a case where sample solution containing inorganic carbon is measured by the method described above with reference to the eighth example of the present invention, the total carbon content of the sample solution is determined. Also in this case, the total organic carbon content of the sample solution can be strictly determined by determining a difference between the total carbon content of the sample solution measured by carrying out UV irradiation and the inorganic carbon content of the sample solution measured without carrying out UV irradiation.

EXAMPLE 9

Hereinbelow, a reactor according to a ninth example of the present invention will be described with reference to FIGS. 12A and 12B.

FIG. 12A is a plan view showing the flow channel configuration of a reactor according to the present invention, FIG. 12B is a sectional view taken along the X-X' line in FIG. 12A, FIG. 12C is a schematic view for explaining a case where the reactor is not operated in accordance with the present invention, and FIG. 12D is a schematic view for explaining a case where the reactor is operated in accordance with the present invention.

In one surface of a substrate 12d, a reaction flow channel (i.e., a second flow channel) 2d whose width and depth are each 1000 μm or less, preferably several hundred micrometers or less and reaction liquid introduction flow channels 53 and 54 connected to the reaction flow channel 2d are formed.

In one surface of a substrate 11d, a reagent introduction flow channel (i.e., a first flow channel) 1d is formed. The substrates 11d and 12d are bonded together so that the flow channels 1d and 2d are partially opposed to each other with a gas exchange unit 5d being interposed therebetween. As the gas exchange unit 5d, a gas exchange membrane or a porous membrane is used.

The substrate 11d has a through hole 9d for discharging a liquid formed at a position corresponding to the end of the flow channel 2d, through holes 51 and 52 for introducing a liquid formed at positions corresponding to the ends of the flow channels 53 and 54 connected to the flow channel 2d, and through holes 6d and 7d for introducing and discharging a liquid into and from the first flow channel.

The substrates 11d and 12d are glass substrates, for example, silica glass substrates.

The flow channels 1d, 2d, 53, and 54 can be formed by for example, micromachining using photolithography and etching, and the through holes 6d, 7d, 9d, 51, and 52 can be formed by for example, sandblasting. In the reactor according to the ninth example of the present invention, the flow channels 1d and 2d intersect at right angles with the gas exchange unit 5 being interposed therebetween. However, the flow channels 1d and 2d may be arranged parallel to each other as in the case of the first example.

Hereinbelow, the operation of the reactor according to the ninth example of the present invention will be described.

Pure water is allowed to flow as a first fluid through the flow channel 1d, and dilute hydrochloric acid is introduced through the flow channel 53 into the flow channel 2d and sodium hydrogen carbonate is introduced through the flow channel 54 into the flow channel 2d to react them in the flow channel 2d to obtain a reaction solution. The reaction solution flowing through the flow channel 2d is defined as a second fluid. As a result of the reaction, carbon dioxide is generated in the flow channel 2d and dissolved in the reaction solution. However, the carbon dioxide unable to be dissolved in the reaction solution is present in the reaction solution in the form of bubbles.

As shown in FIG. 12C, in a case where a difference in liquid sending pressure is not provided between the flow channels 1d and 2d, the reaction solution containing bubbles is discharged through the through hole 9d and flows downstream. In this case, bubbles contained in the reaction solution will cause trouble when a detector or another reactor is provided downstream of the through hole 9d.

On the other hand, as shown in FIG. 12D, in a case where a pressure in the flow channel 2d is made higher than a pressure in the flow channel 1d in accordance with the present invention by for example, connecting a resistance tube to a discharge flow channel connected to the through hole 9d, bubbles contained in the reaction solution are transferred through the gas exchange unit 5 into the flow channel 1d. Therefore, it is possible to remove bubbles from the reaction solution and to thereby prevent the reaction solution containing bubbles from being discharged through the through hole 9d and flowing downstream.

Another example of reaction carried out using the reactor according to the present invention is as follows: Pure water is allowed to flow as a first fluid through the first flow channel 1d, and a 0.5% hydrogen peroxide solution is introduced through the flow channel 53 into the flow channel 2d and a 1M aqueous iron alum solution is introduced through the flow channel 54 into the flow channel 2d to react them in the flow channel 2d to obtain a reaction solution. In this case, oxygen is generated in the flow channel 2d as a result of the reaction and is dissolved in the reaction solution, but the oxygen unable to be dissolved in the reaction solution is present in the reaction solution in the form of bubbles. Also in this case, as shown in FIG. 12D, by making a pressure in the flow channel 2d higher than a pressure in the flow channel 1d, it is possible to remove bubbles of oxygen from the reaction solution by allowing the bubbles to transfer through the gas exchange unit 5 into the flow channel 1d and thereby to prevent the reaction solution containing bubbles from being discharged through the through hole 9d and flowing downstream.

EXAMPLE 10

Hereinbelow, a cell culture apparatus according to a tenth example of the present invention will be described with reference to FIGS. 13A and 13B. FIG. 13A is a plan view showing the flow channel configuration of a cell culture apparatus according to the present invention; FIG. 13B is a sectional view taken along the X-X' line in FIG. 13A; FIG. 13C is a schematic view for explaining a case where the cell culture apparatus shown in FIG. 13A is not operated in accordance with the present invention; and FIG. 13D is a schematic view for explaining a case where the cell culture apparatus shown in FIG. 13A is operated in accordance with the present invention.

On one surface of a substrate 12e, a cell culture medium flow channel (i.e., a second flow channel) 2e whose width and depth are each 1000 μm or less, preferably several hundred micrometers or less is formed. A part of the flow channel 2e is widened and deepened to be used as a cell culture chamber 61. The cell culture chamber 61 is formed by machining the substrate 2e or by bonding two or more substrates together. For example, a cylindrical-shaped recess may be previously formed as the cell culture chamber 61 in the substrate 12e. In this case, the flow channel 2e is formed after the cell culture chamber 61 is formed.

On one surface of a glass substrate 11e, a gas flow channel (i.e., a first flow channel) 1e is formed. The substrates 11e and 12e are bonded together so that the flow channels 1e and 2e are partially opposed to each other with a gas exchange unit 5e being interposed therebetween. As the gas exchange unit 5e, a gas exchange membrane or a porous membrane is used.

The substrate 11e has a through hole 8e for supplying a cell culture medium formed at a position corresponding to one end of the flow channel 2e, a through hole 9e for discharging a cell culture medium formed at a position corresponding to the other end of the flow channel 2e, and through holes 6e and 7e for introducing and discharging a liquid into and from the flow channel 1e.

The substrates 11e and 12e are glass substrates, for example, silica glass substrates.

The flow channels 1e and 2e and the cell culture chamber 61 can be formed by for example, micromachining using photolithography and etching, and the through holes 6e to 9e can be formed by for example, sandblasting.

In the cell culture apparatus according to the tenth example of the present invention, the flow channels 1e and 2e intersect at right angles with the gas exchange unit 5e being interposed therebetween. However, the flow channels 1e and 2e may be arranged parallel to each other as in the case of the first example.

Hereinbelow, the operation of the cell culture apparatus according to the tenth example of the present invention will be described.

Cells 63 are contained in the cell culture chamber 61, and a cell culture medium is supplied through the flow channel 2e to the cell culture chamber 61. The temperature of the cell culture apparatus is adjusted to 35° C., and a mixed gas of oxygen (20%), carbon dioxide (5%), and nitrogen (75%) is allowed to flow through the flow channel 1e to keep the concentrations of oxygen and carbon dioxide in the cell culture medium optimal.

Oxygen and carbon dioxide contained in the mixed gas flowing through the flow channel 1e are transferred through the gas exchange unit 5e into the cell culture medium flowing through the flow channel 2e so that the concentrations of oxygen and carbon dioxide in the cell culture medium are kept optimal.

As shown in FIG. 13C, in a case where a difference in liquid sending pressure is not provided between the flow channels 1e and 2e, bubbles are also transferred from the mixed gas flowing through the flow channel 1e through the gas exchange unit 5e into the cell culture medium flowing through the flow channel 2e. In this case, there is a possibility that the bubbles are trapped in the cell culture chamber 61, resulting in poor contact between the cells 63 and the cell culture medium.

On the other hand, as shown in FIG. 13D, in a case where a pressure in the flow channel 2e is made higher than a pressure in the flow channel 1e in accordance with the present invention by for example, connecting a resistance tube to a discharge flow channel connected to the through hole 9e, the entry of bubbles into the cell culture medium is prevented, thereby making it possible to keep good contact between the cells 63 and the cell culture medium in the cell culture chamber 61.

Figure 1A:
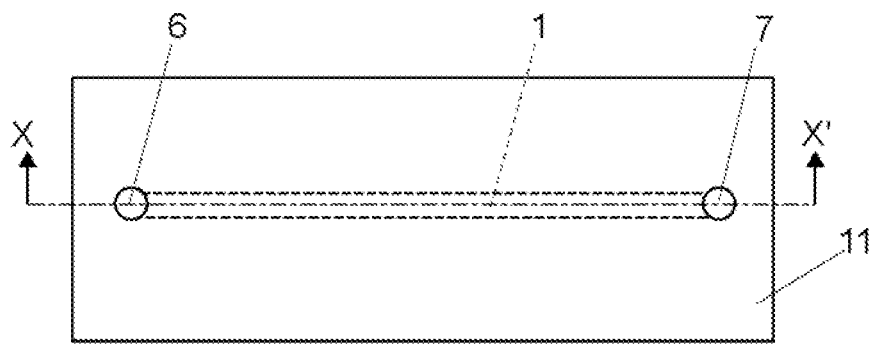
FIG. 1A is a plan view of one example of a gas exchange apparatus according to the present invention.
Figure 1B:
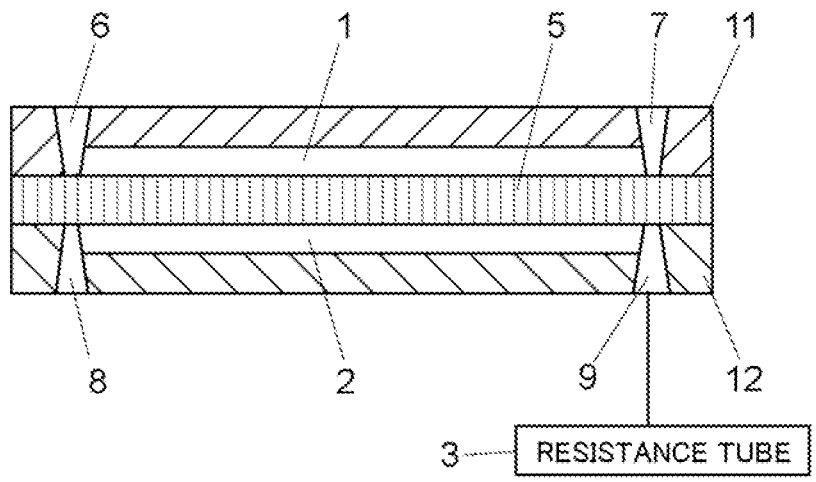
FIG. 1B is a sectional view taken along the X-X' line in FIG. 1A.
Figure 2A:
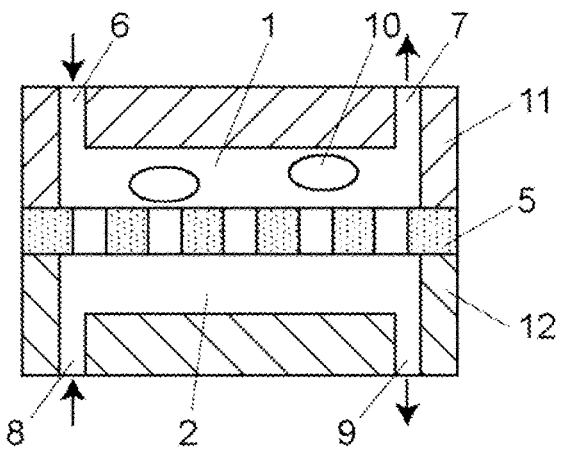
FIG. 2A is a sectional view schematically showing one example of a method for controlling pressure-difference bubble transfer according to the present invention.
Figure 2B:
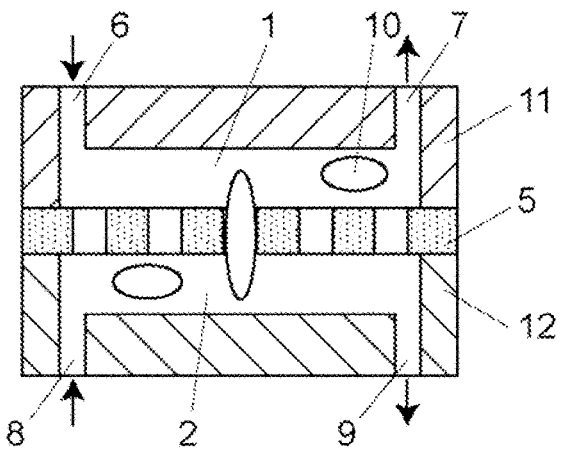
FIG. 2B is a sectional view schematically showing another example of the method for controlling pressure-difference bubble transfer according to the present invention.
Figure 2C:
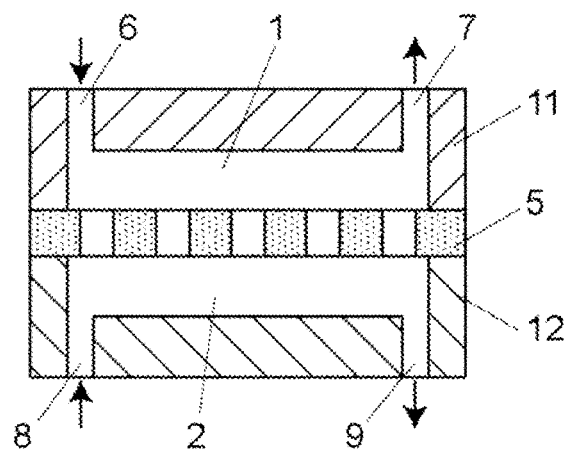
FIG. 2C is a sectional view schematically showing still another example of the method for controlling pressure-difference bubble transfer according to the present invention.
Figure 2D:
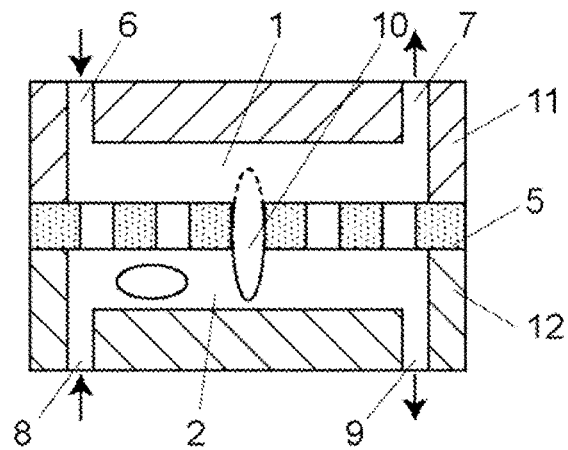
FIG. 2D is a sectional view schematically showing still another example of the method for controlling pressure-difference bubble transfer according to the present invention.
Figure 3:
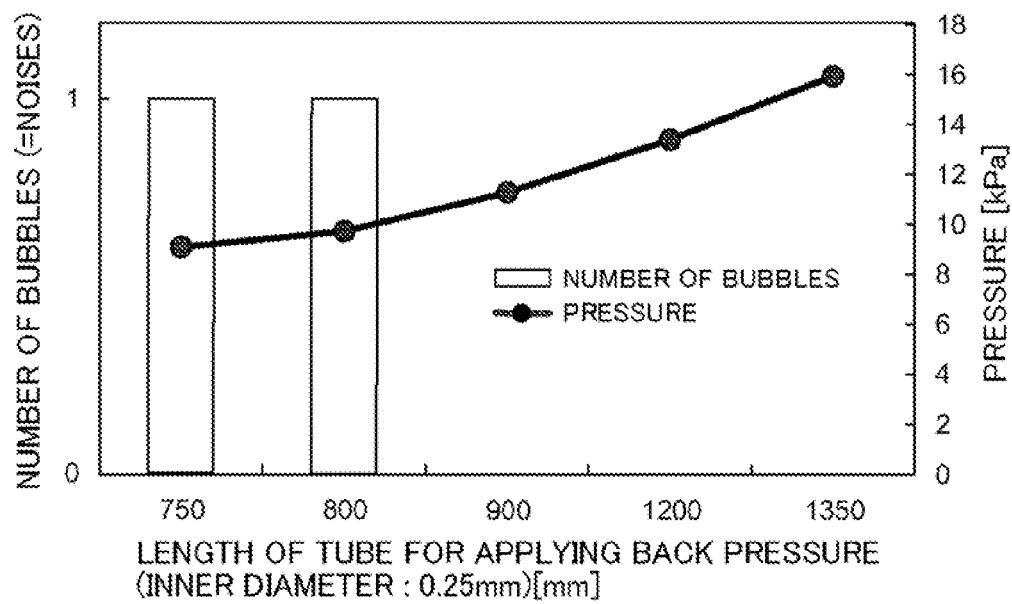
FIG. 3 is a graph showing the relationship among the length of a resistance tube, bubble transfer and a pressure difference.
Figure 4:
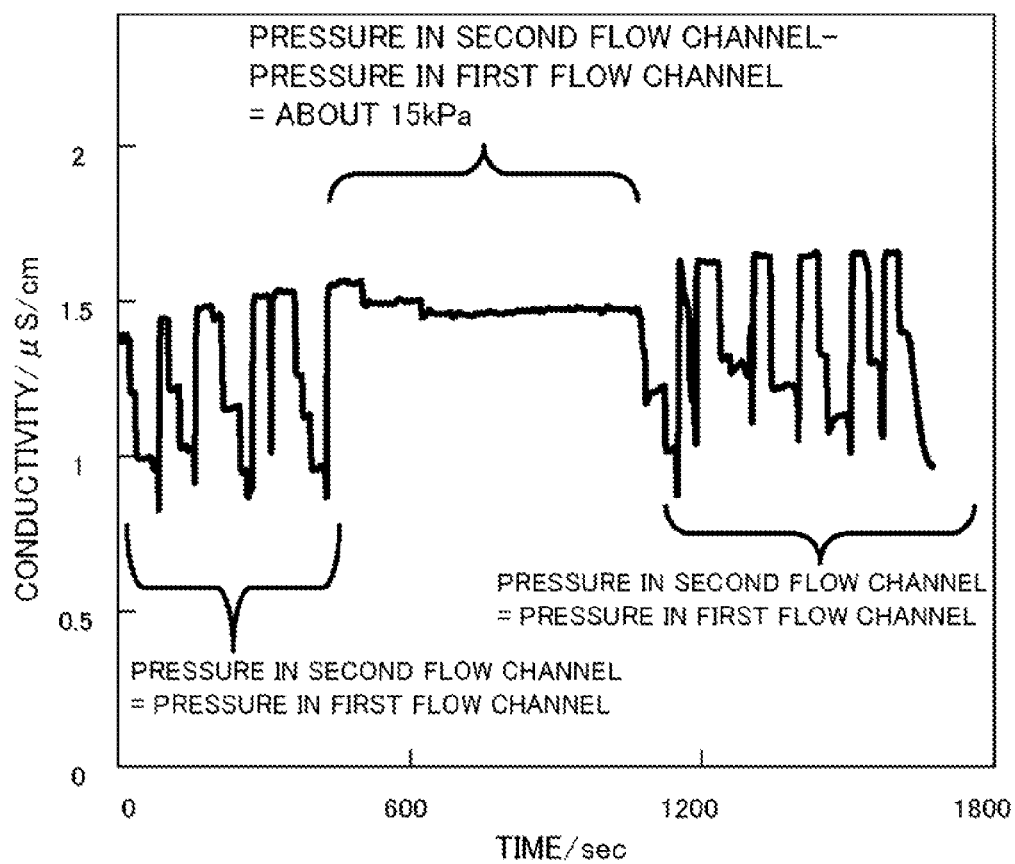
FIG. 4 is a waveform chart showing the fluctuation of an electrical conductivity measurement signal caused by transfer of bubbles.
Figure 5:
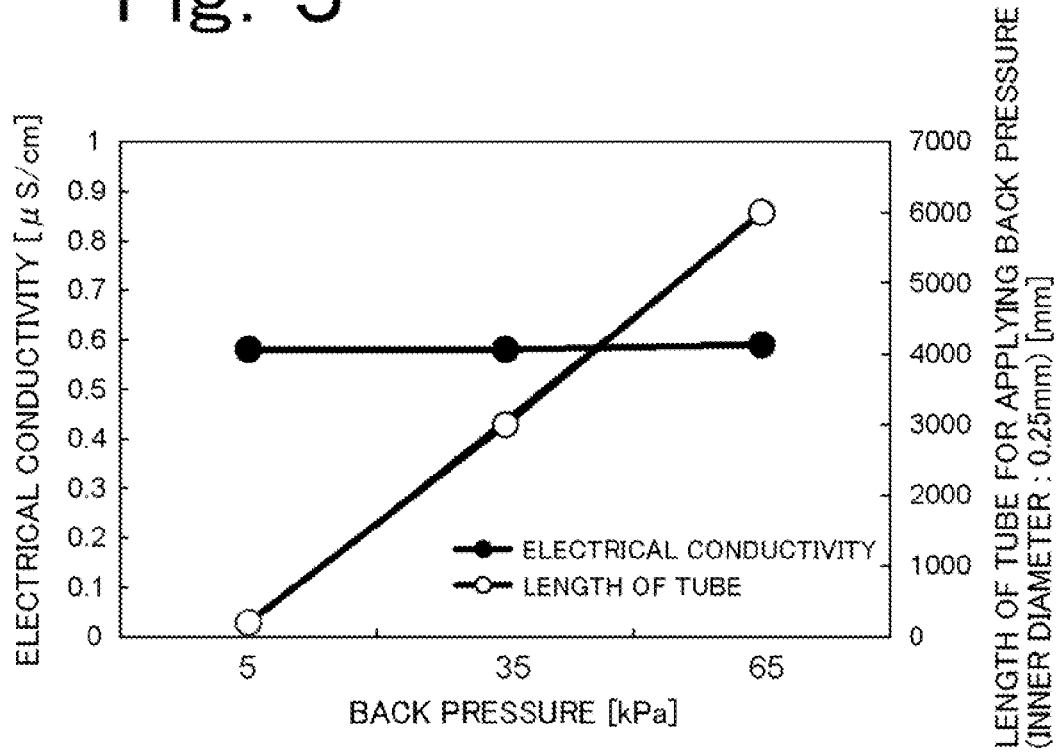
FIG. 5 is a graph showing the relationship among a liquid sending pressure difference, a measured value of electrical conductivity and the length of a resistance tube.
Figure 6A:
FIG. 6A is a sectional view schematically showing the membrane structure of a conventional gas permeable membrane.
Figure 6B:
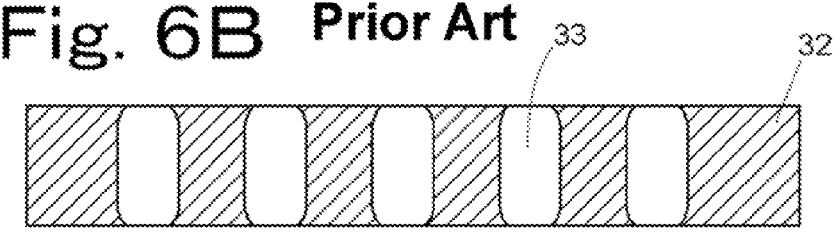
FIG. 6B is a sectional view schematically showing the membrane structure of a conventional membrane filter.
Figure 6C:
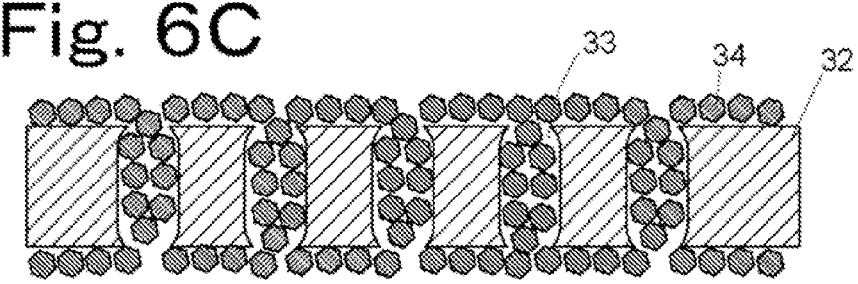
FIG. 6C is a sectional view schematically showing one example of the membrane structure of a gas permeable filter for use in a gas exchange apparatus according to the example.
Figure 6D:
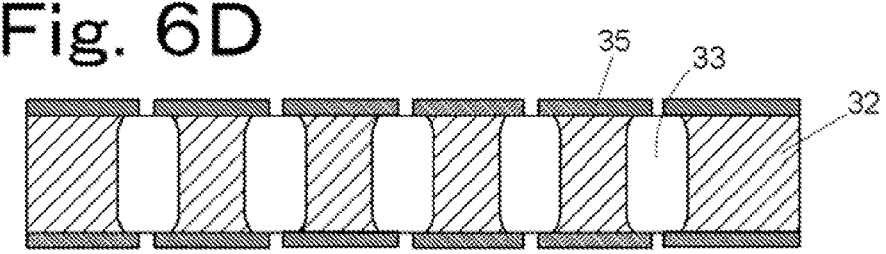
FIG. 6D is a sectional view schematically showing another example of the membrane structure of the gas permeable filter for use in the gas exchange apparatus according to the example.
Figure 6E:
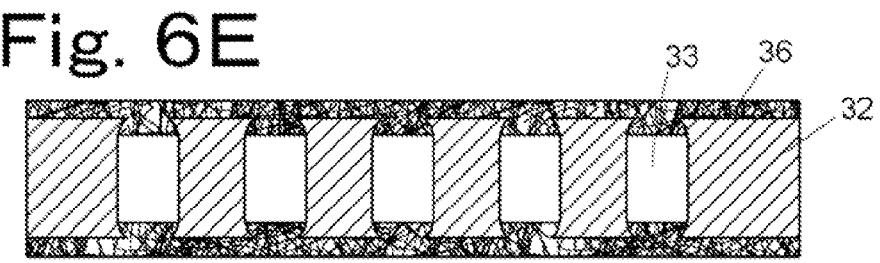
FIG. 6E is a sectional view schematically showing another example of the membrane structure of the gas permeable filter for use in the gas exchange apparatus according to the example.
Figure 7A:
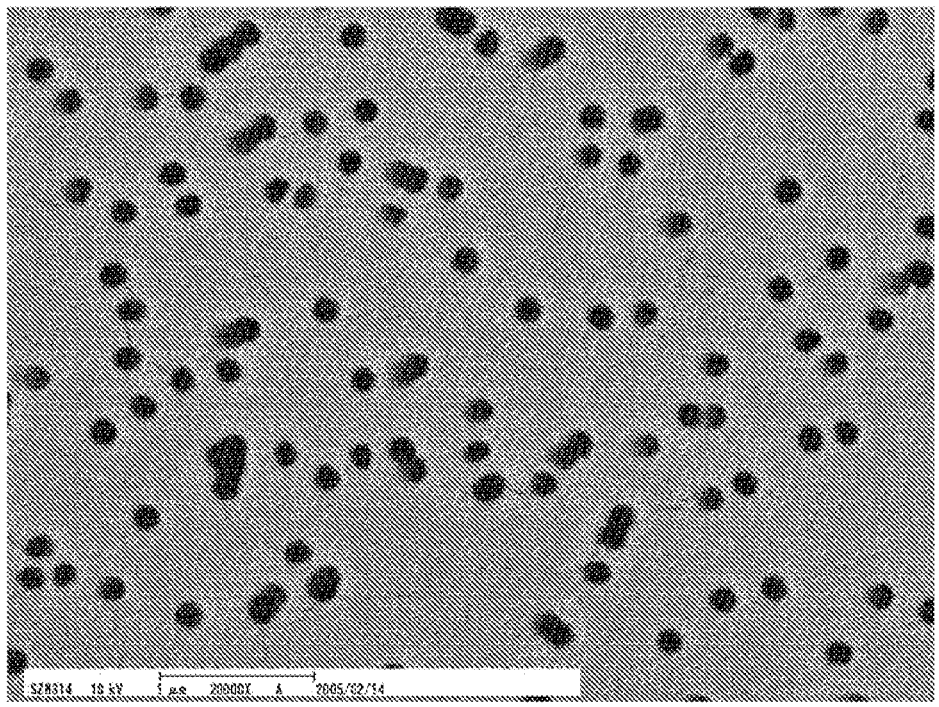
FIG. 7A is an SEM image of the surface of a membrane filter.
Figure 7B:
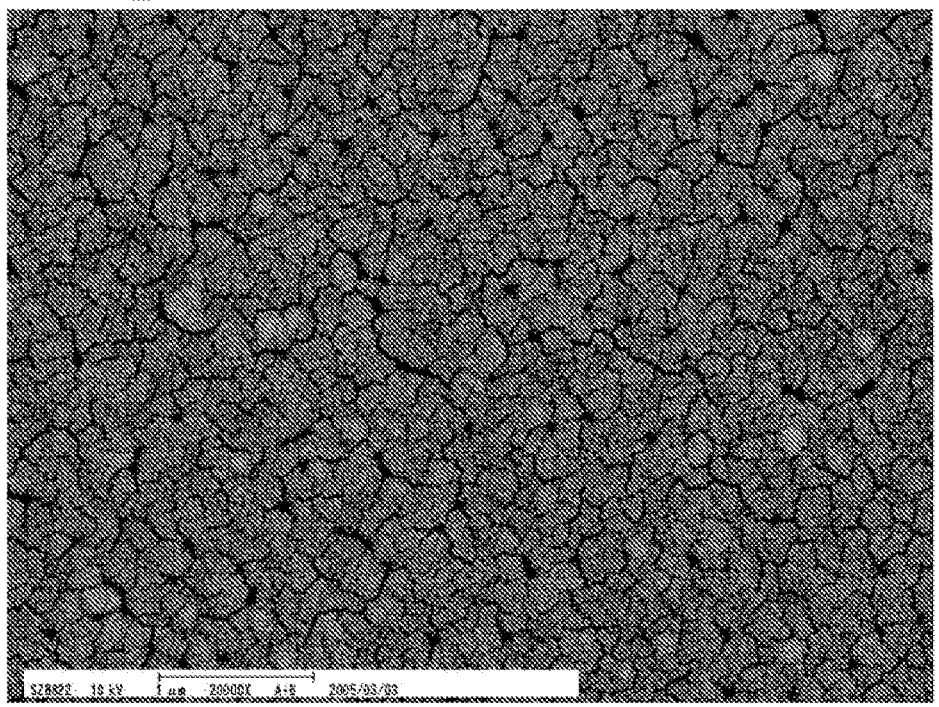
FIG. 7B is an SEM image of the surface of the membrane filter shown in FIG. 7A coated with a gas permeable layer formed of a hydrophobic material.
Figure 8A:
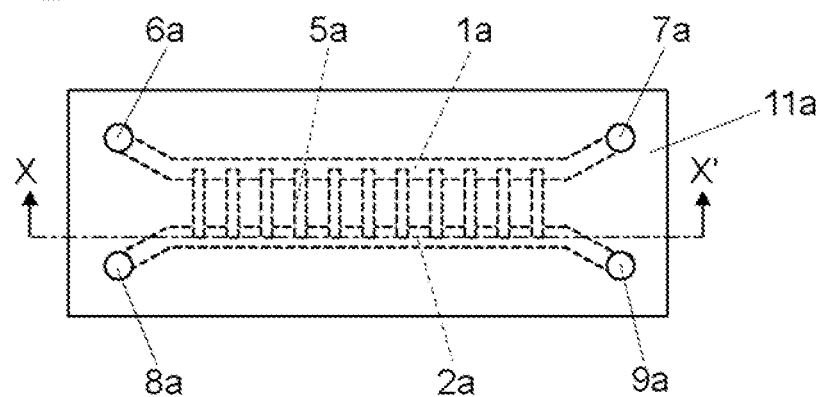
FIG. 8A is a plan view of another example of the gas exchange apparatus.
Figure 8B:
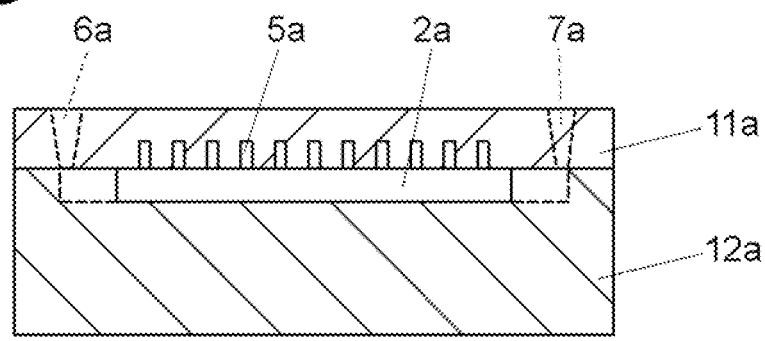
FIG. 8B is a sectional view taken along the X-X' line in FIG. 8A.
Figure 9A:
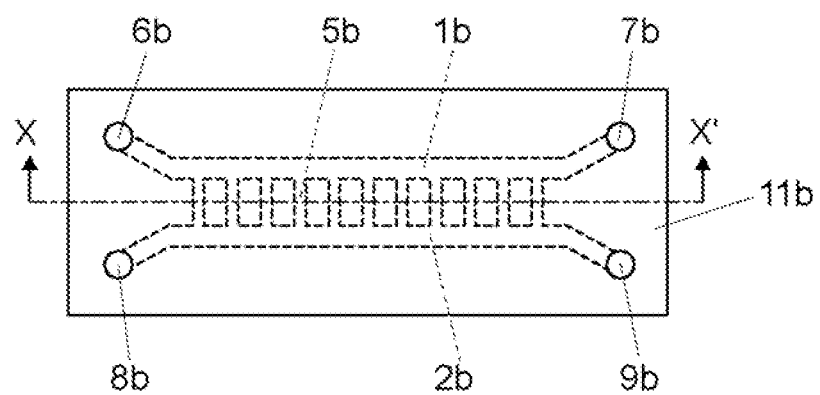
FIG. 9A is a plan view of still another example of the gas exchange apparatus.
Figure 9B:
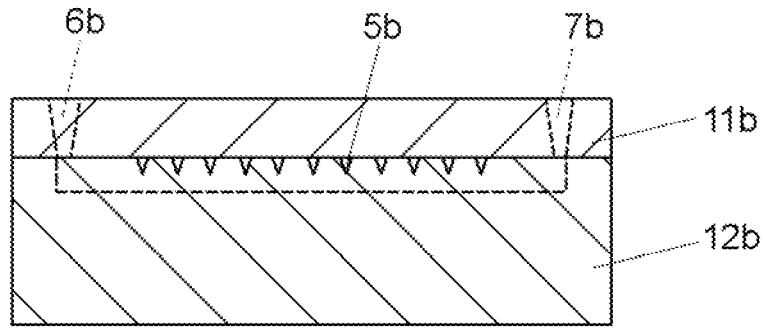
FIG. 9B is a sectional view taken along the X-X' line in FIG. 9A.
Figure 10:
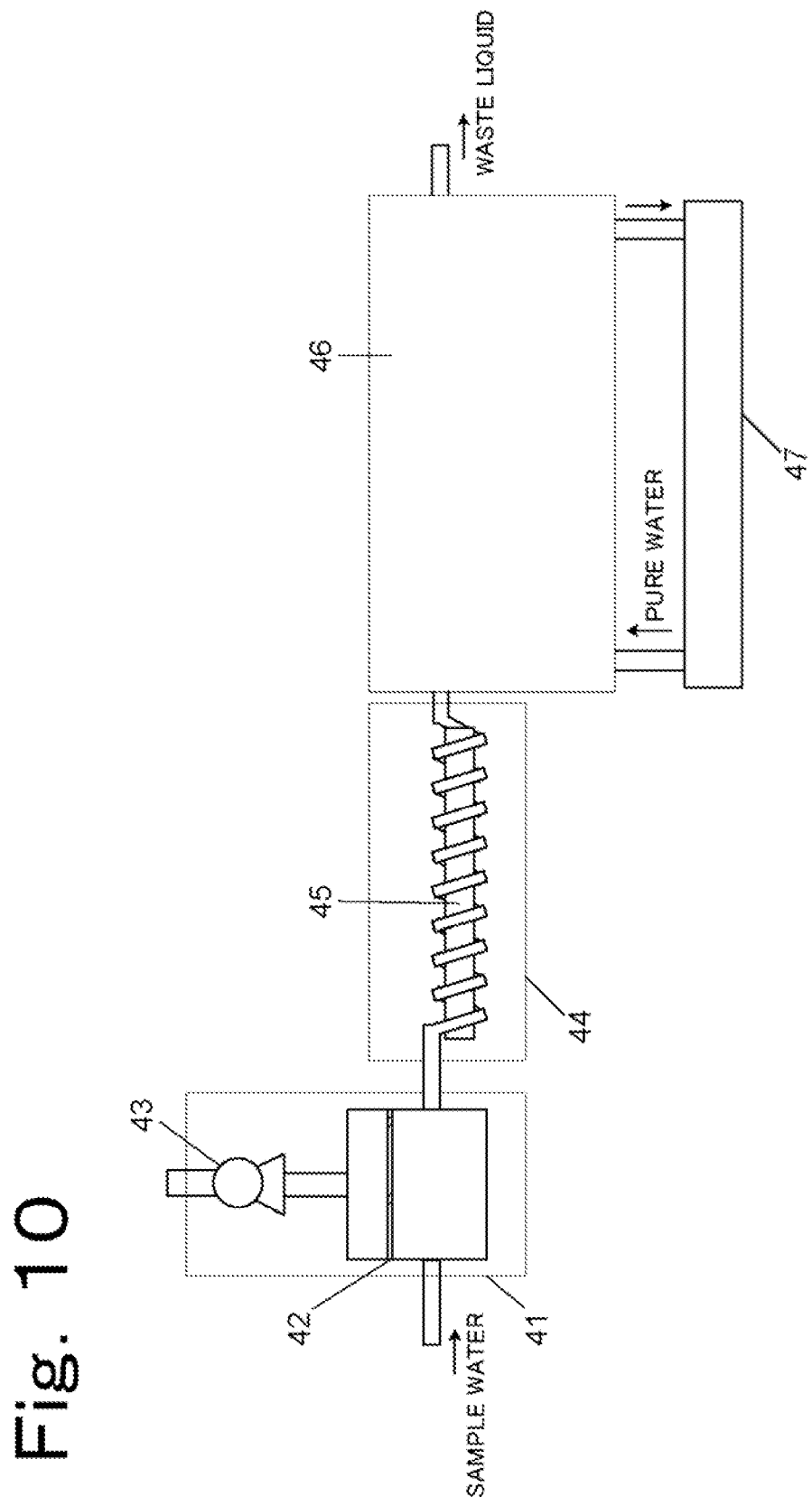
FIG. 10 is a schematic view showing the structure of one example of a total organic carbon measuring apparatus.
Figure 11:
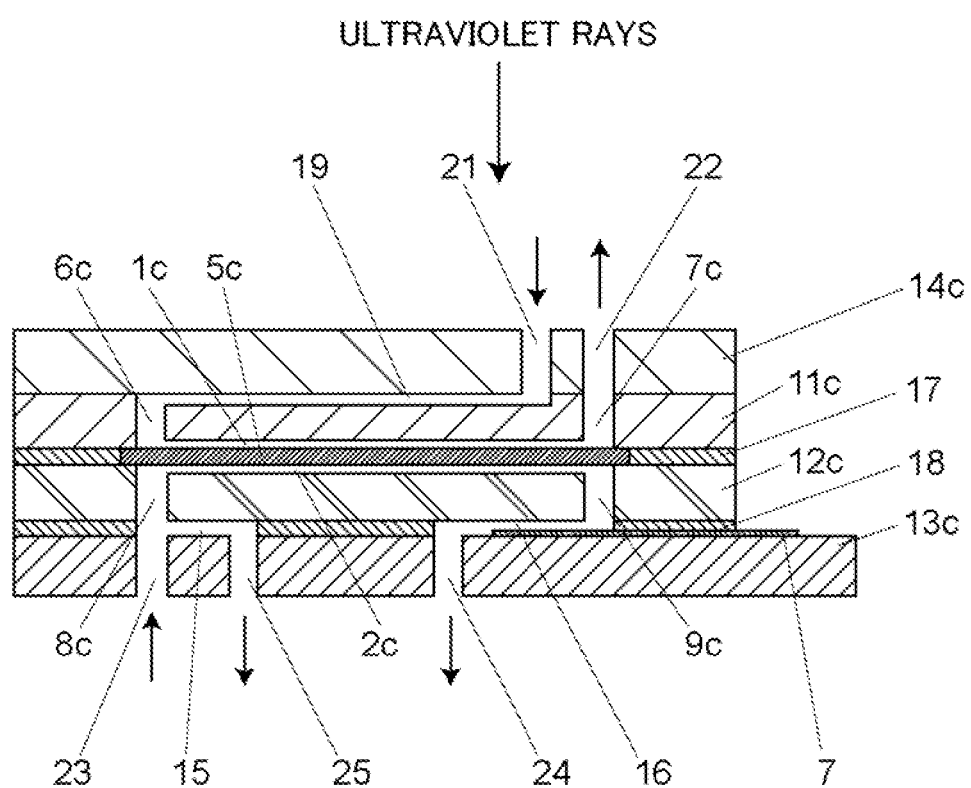
FIG. 11 is a sectional view schematically showing another example of the total organic carbon measuring apparatus.
Figure 12A:
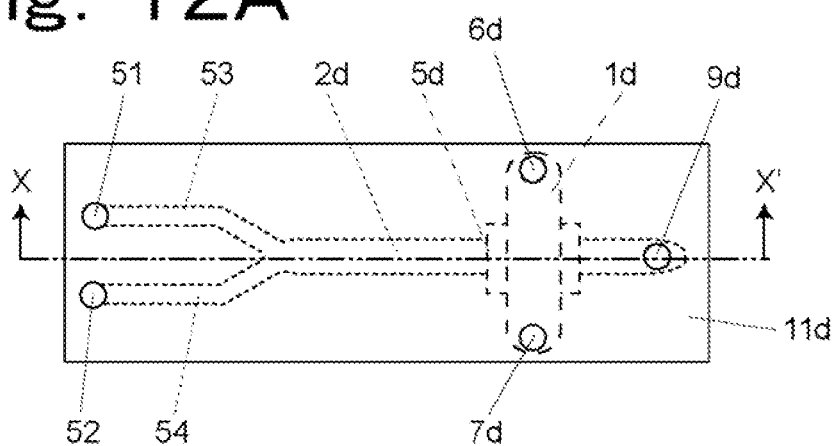
FIG. 12A is a plan view of one example of a reactor.
Figure 12B:
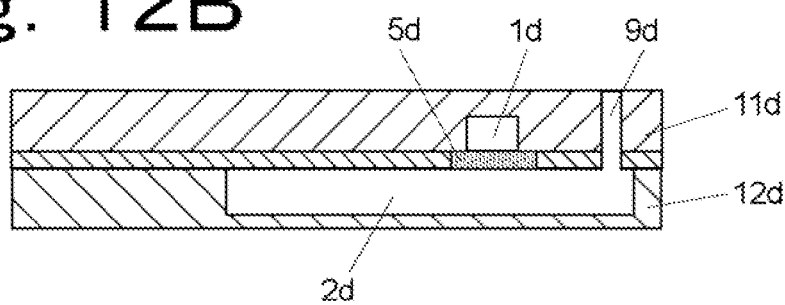
FIG. 12B is a sectional view taken along the X-X' line in FIG. 12A.
Figure 12C:
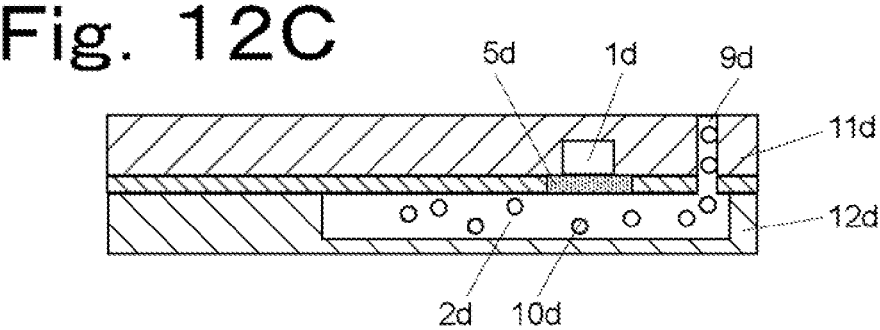
FIG. 12C is a sectional view for explaining a case where the reactor shown in FIG. 12A is not operated in accordance with the example.
Figure 12D:
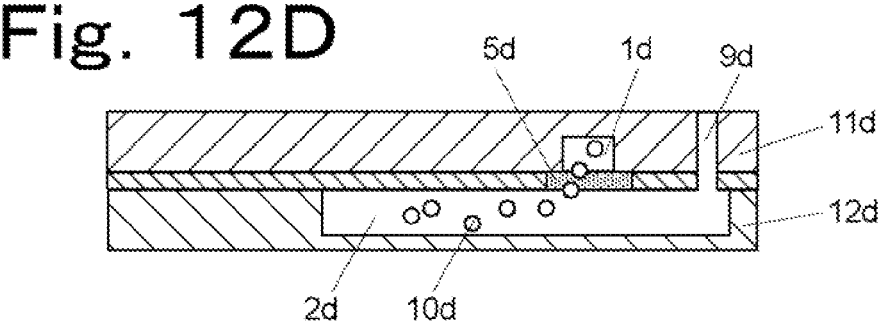
FIG. 12D is a sectional view for explaining the operation of the reactor shown in FIG. 12A.
Figure 13A:
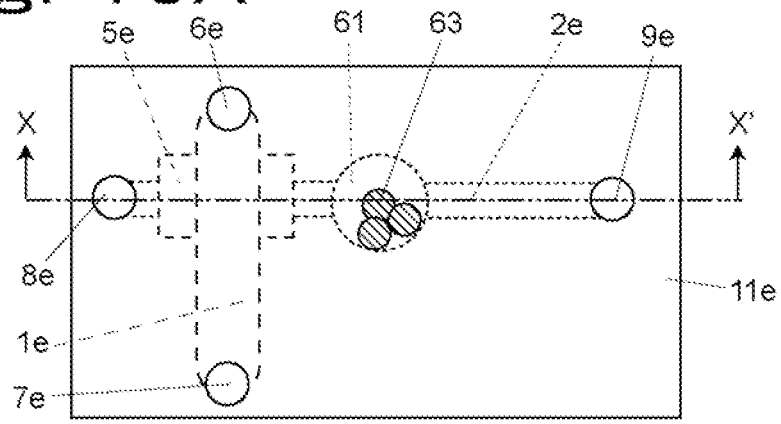
FIG. 13A is a plan view of one example of a cell culture apparatus.
Figure 13B:
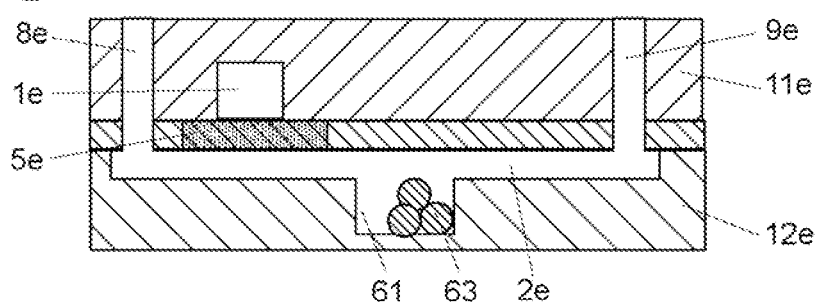
FIG. 13B is a sectional view taken along the X-X' line in FIG. 13A.
Figure 13C:
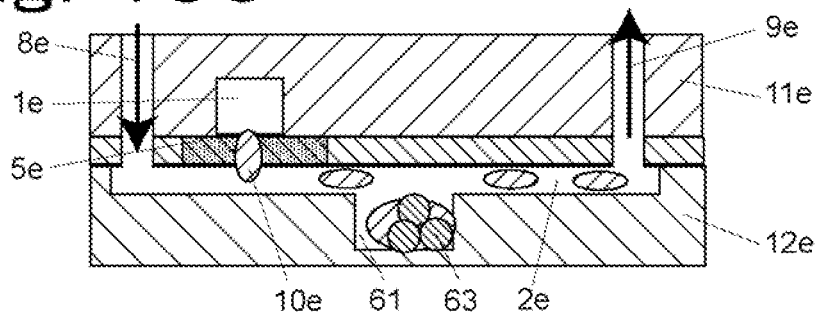
FIG. 13C is a sectional view for explaining a case where the reactor shown in FIG. 13A is not operated in accordance with the example.
Figure 13D:
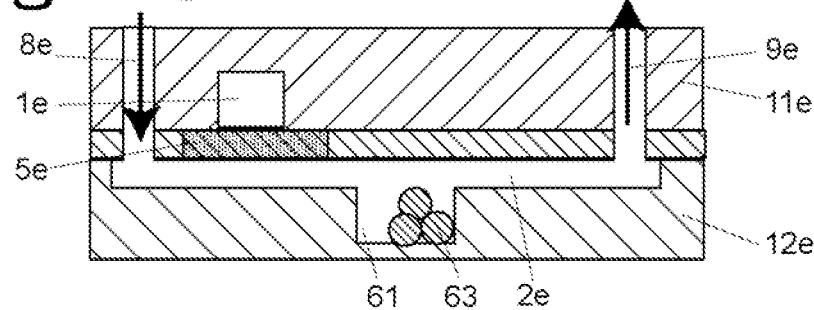
FIG. 13D is a sectional view for explaining the operation of the reactor shown in FIG. 13A.

DESCRIPTION OF THE REFERENCE NUMERALS 1, 1a to 1e first flow channel
2, 2a to 2e second flow channel
3 resistance tube
5, 5a to 5e gas exchange unit
6 to 9, 6a to 9a, 6b to 9b, 6c to 9c through hole
10, 10d bubble
11, 11a to 11e first substrate
12, 12a to 12e second substrate
13c third substrate
14c fourth substrate branching flow channel
19 oxidation flow channel
61 cell culture chamber
63 cell

What is claimed is:

1. A pressure-difference bubble transfer control method comprising:

disposing a first flow channel for flowing a first fluid of liquid and a second flow channel for flowing a second fluid of liquid with a gas exchange unit, through which a liquid cannot pass but a gas component(s) can pass, being interposed therebetween;

transferring a dissolved gas component due to concentration gradient from the first fluid into the second fluid through the gas exchange unit, the dissolved gas component being initially contained in the first fluid; and transferring bubbles from the second fluid into the first fluid due to a pressure difference between the first and second flow channels with the gas exchange unit interposed therebetween by making a pressure in the second flow channel higher than a pressure in the first flow channel, wherein the gas exchange unit comprises one element, and the element being selected from the group consisting of:
(a) a porous gas permeable membrane,
(b) a membrane filter having a plurality of pores penetrating therethrough,
(c) a membrane filter having a plurality of pores penetrating therethrough and a gas permeable layer formed of a hydrophobic material on the membrane filter to prevent the transfer of a liquid through the pores of the membrane filter and to form gaps through which only a gas component(s) contained in the liquid can pass, and
(d) a plurality of grooves connecting the first and second flow channels to each other, at least a part of the inner surface of each of the grooves being hydrophobized and the cross-sectional area of each of the grooves being determined so that a liquid cannot be transferred through the grooves but only a gas component(s) contained in the liquid can be transferred through the grooves.

2. The pressure-difference bubble transfer control method according to claim 1, wherein a pressure in the second flow channel is made higher than a pressure in the first flow channel by connecting a flow channel resistance member downstream of the second flow channel.

3. The pressure-difference bubble transfer control method according to claim 1, wherein when a liquid containing carbon dioxide is allowed to flow as the first fluid through the first flow channel and deionized water is allowed to flow as the second fluid through the second flow channel, carbon dioxide is transferred from the first fluid into the second fluid while the transfer of bubbles between the first and second flow channels is controlled.

4. The pressure-difference bubble transfer control method according to claim 1, wherein when a liquid containing carbon dioxide and oxygen is allowed to flow as the first fluid through the first flow channel and a cell culture medium is allowed to flow as the second fluid through the second flow channel, carbon dioxide and oxygen are transferred from the first fluid into the second fluid while the entry of bubbles from the first fluid into the second fluid is prevented.

* * * * *